United States Patent [19]

Mokdad

[11] Patent Number: 5,797,297
[45] Date of Patent: Aug. 25, 1998

[54] DAMPING FLYWHEEL, NOTABLY FOR MOTOR VEHICLES

[75] Inventor: Ayman Mokdad, Saint-Ouen, France

[73] Assignee: Valeo, France

[21] Appl. No.: 693,303

[22] PCT Filed: Dec. 13, 1995

[86] PCT No.: PCT/FR95/01654

§ 371 Date: Aug. 16, 1996

§ 102(e) Date: Aug. 16, 1996

[87] PCT Pub. No.: WO96/18832

PCT Pub. Date: Jun. 20, 1996

[30] Foreign Application Priority Data

Dec. 16, 1994 [FR] France .................. 94 15367

[51] Int. Cl.[6] .................................................. F16F 15/10
[52] U.S. Cl. .................. 74/574; 74/572; 464/64; 464/68; 132/106.1; 132/106.2
[58] Field of Search ............... 74/572–574; 192/213.21, 192/213.3, 70.18; 464/68

[56] References Cited

U.S. PATENT DOCUMENTS

| | | | |
|---|---|---|---|
| 4,305,492 | 12/1981 | Mori et al. | 192/98 |
| 4,533,338 | 8/1985 | Hamada | 464/64 |
| 4,564,097 | 1/1986 | Kabayama | 464/68 X |
| 4,585,428 | 4/1986 | Asada | 464/68 |
| 4,651,860 | 3/1987 | Nagano | 464/68 X |
| 4,854,029 | 8/1989 | Naudin | 192/70.18 X |
| 4,889,009 | 12/1989 | Friedmann et al. | 74/574 |
| 4,904,226 | 2/1990 | Chasseguet et al. | 464/68 |
| 4,928,486 | 5/1990 | Despres | 74/574 X |
| 5,634,543 | 6/1997 | Hashimoto et al. | 192/213.21 |

FOREIGN PATENT DOCUMENTS

| | | |
|---|---|---|
| 2690722 | 11/1993 | France . |
| 2718814 | 11/1993 | France . |
| 2658880 | 8/1995 | France . |
| 3712876 | 11/1987 | Germany . |
| 3622630 | 1/1988 | Germany . |
| 3926384 | 2/1991 | Germany . |
| 94/27062 | 11/1994 | WIPO . |

*Primary Examiner*—Vinh T. Luong
*Attorney, Agent, or Firm*—Longacre & White

[57] ABSTRACT

A flywheel having two coaxial masses (1,2) mounted so as to move with respect to one another and counter to a radially acting elastic member (3) and an axially acting friction member (4) disposed therebetween. The first mass (1) may be fixed, with respect to rotation, to a drive plate. The second mass (2), is releasably fixed, with respect to rotation, on a driven shaft. The friction member 4 is supported by the first mass 1 and disposed axially between the first mass and the elastic member 3.

5 Claims, 4 Drawing Sheets

DAMPING FLYWHEEL, NOTABLY FOR MOTOR VEHICLES

BACKGROUND OF THE INVENTION

1. Field of the Invention

The present invention concerns damping flywheels, notably for motor vehicles, which have two coaxial masses mounted so as to be movable with respect to one another counter, firstly, to elastic means having at least one elastic member acting radially overall between the said masses and pivotally mounted on each of the latter and, secondly, axially acting friction means. Such a flywheel is described for example in the document FR 94 04437, filed on 14 Apr., 1994.

2. Description of the Prior Art

In this document (FIG. 1), one i of the masses (the first) is fixed with respect to rotation to the crankshaft 20 of the engine of the vehicle, while the other mass 2 constitutes the reaction plate of a friction clutch.

The elastic means are pivotally mounted, on the one hand, on the first mass by means of first pivot means and, on the other hand, on the second mass by means of second pivot means.

The friction means are located radially above the second pivot means.

The reaction plate 2 is hollowed out at 101 to house friction means 4 carried by a sheet metal component 100 integral with the first mass and defining with the latter a clevis for the pivotal mounting of the elastic means 3. The mass 2 presents a friction face for the friction disc 30 of the clutch.

This mass 2 is curved at 102 level with its hollow 101 for the mounting at its internal periphery of pivot pins for the elastic means 3.

As a result, the shape of the mass 2 is complicated, particularly since it has perforations for the fitting of driving studs 103 belonging to the friction means 4.

The friction disc 30 has a twisted shape at its internal periphery so as to be able to pass round the curved part 102 of the mass 2.

Furthermore, the friction means are relatively noisy, since they are carried by a component 100 made of thin metal sheet. In addition, these friction means are sensitive to the temperature of the mass 2, which can heat up notably when it forms the reaction plate of the friction clutch.

The object of the present invention is to overcome these drawbacks and therefore to simplify the second mass while attenuating noise and offering the friction means better thermal protection.

SUMMARY OF THE INVENTION

According to the invention, a damping flywheel of the aforementioned type is characterised in that the friction means are carried for the most part by the first mass, being located axially between the said first mass and the said elastic means, and in that the friction means have at least one friction washer suitable for being rotated, if applicable after a clearance has been taken up, by the second mass.

By virtue of the invention, the friction means enjoy better thermal protection, since they are further away from the second mass, which may attain much higher temperatures than the first mass.

Advantageously, the friction washer is driven by the second pivot means or a component attached to the second pivot means, for example a bush surrounding the second pivot means.

The second mass is simplified and stiffened since it has no hollow and no curved part.

Furthermore the friction disc is simplified since it is not necessary to provide a twisted shape at its internal periphery by virtue of the fact that the second mass has no curved part.

It is possible to increase the diameter of insertion of the pins carried by the second mass for the pivotal mounting of the elastic means. This is made possible by the absence of a hollow. Improved insertion of the pins is thereby obtained.

Noise is also attenuated since the first mass is more solid than the component 100 in FIG. 1. This component is therefore simplified and serves principally for mounting the pivot pins of the elastic means.

This assists a reduction in the axial size of the damping flywheel, the elastic means being able to come as close as possible to the second mass. This also enables the thickness of the first mass to be increased. The latter can therefore have a greater thickness at its external periphery than at its internal periphery, which assists the increasing of the inertia of the damping flywheel.

Furthermore, this variation in thickness is advantageously exploited in order to locate the friction means having at least one friction washer clamped axially between the first mass and an application washer fixed with respect to rotation on the first mass and subject to the action of an axially acting elastic washer bearing on a shoulder fixed to the first mass.

The application washer has for example at its external periphery lugs engaged in grooves formed in the first mass by virtue of the variation in the thickness thereof.

These grooves are easily produced by casting.

The friction washer has for example at its internal periphery a thicker area in which are formed recesses each advantageously adapted to receive an extension of the pivot pin of the elastic means carried by the second mass.

The friction means thus extend for the most part radially beyond the said pivot pins, which thus perform a dual function. The number of components is thus reduced by eliminating the studs 103.

The description which follows illustrates the invention in conjunction with the accompanying drawings in which:

DETAILED DESCRIPTION PREFERRED EMBODIMENT

Figure 2:
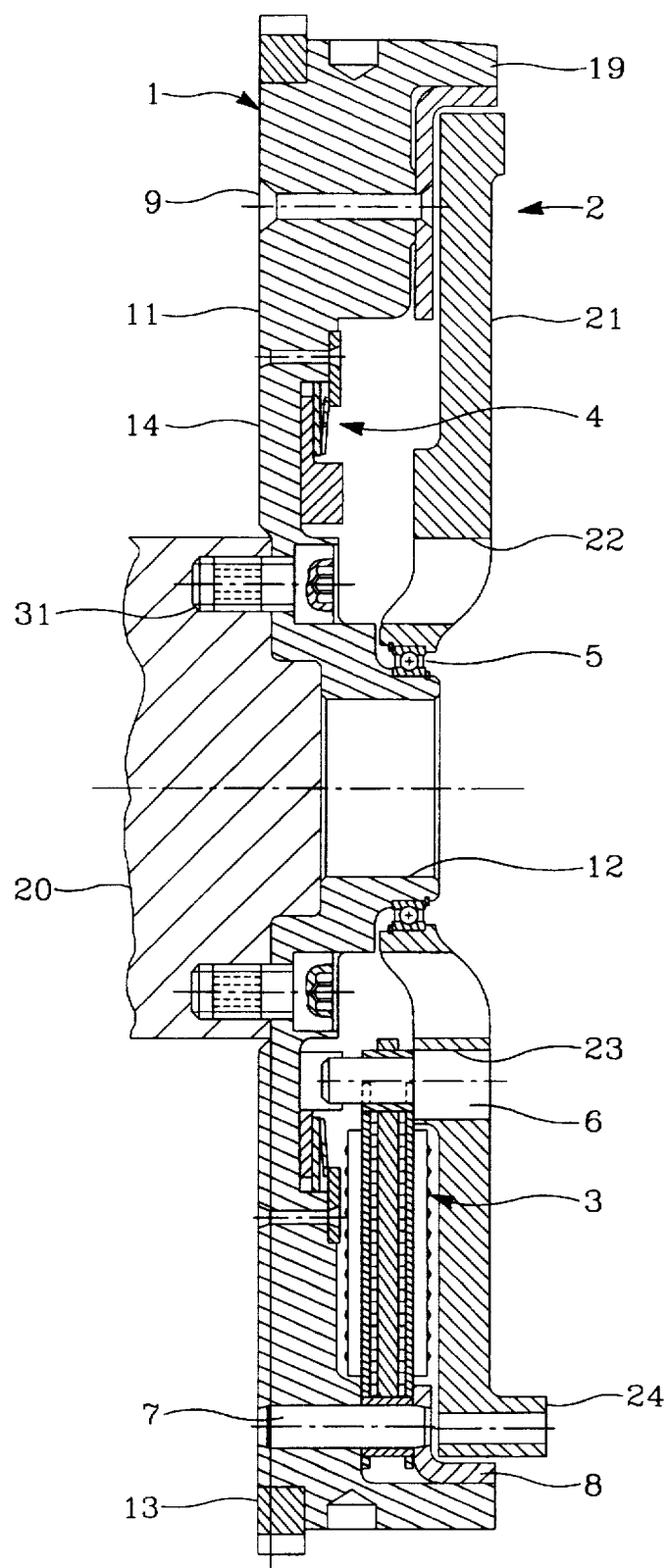
FIG. 2 is a view in axial section of a damping flywheel according to the invention.
Figure 3:
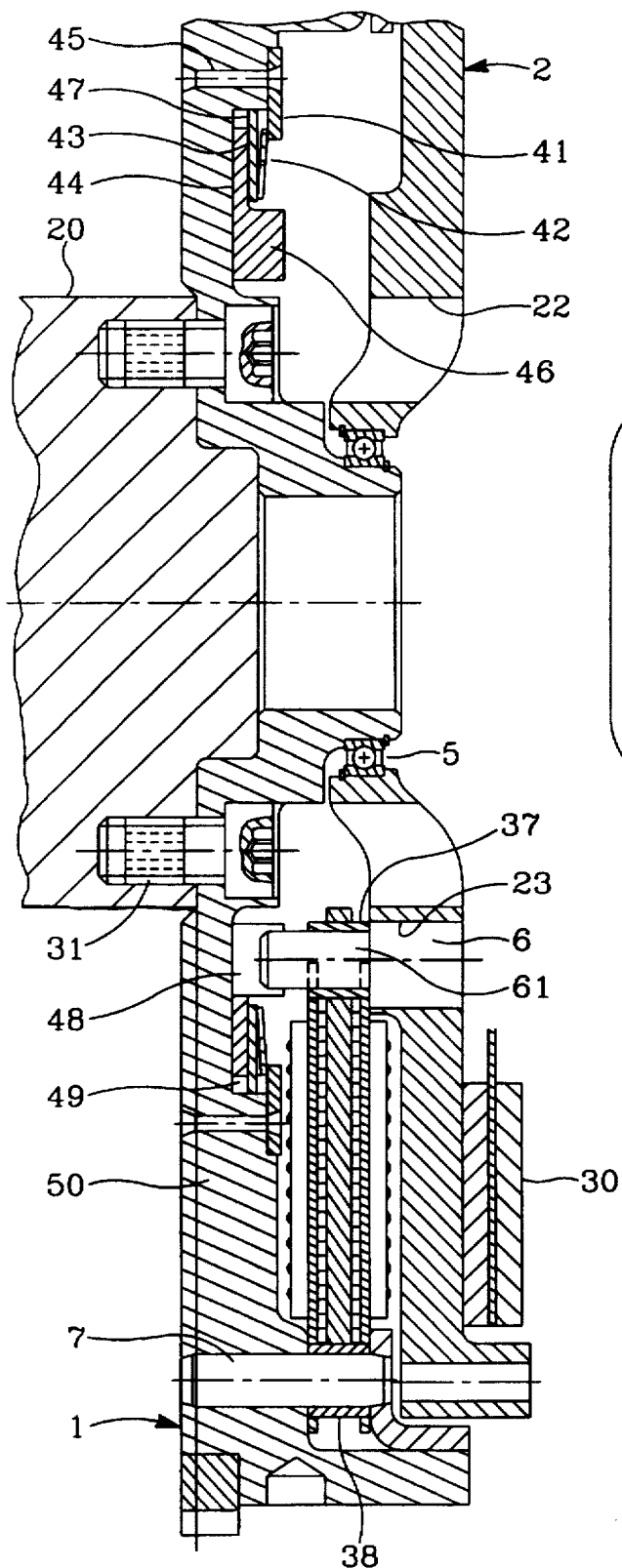
FIG. 3 is a partial view to a larger scale of FIG. 2.
Figure 4:
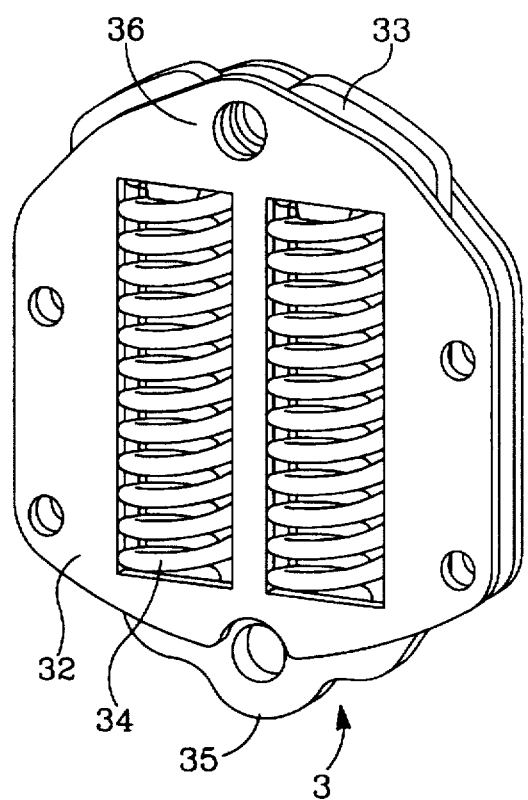
FIG. 4 is a perspective view partially showing a cartridge belonging to the elastic means of the damping flywheel.
Figure 5:
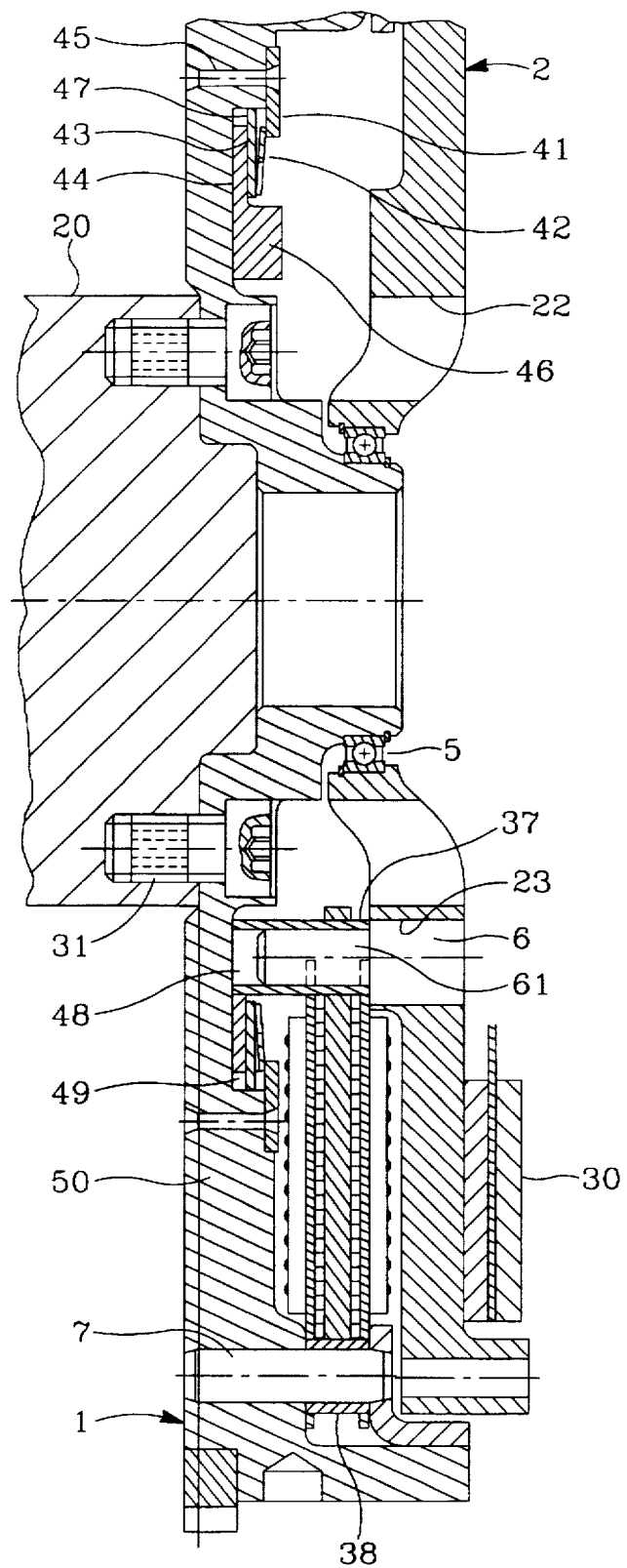
FIG. 5 represents an alternative embodiment of the claimed invention.

In FIGS. 2 to 4, references common to the prior art and the invention will be given the same reference numbers.

Thus in FIGS. 2 to 4, a damping flywheel, commonly known as a double damping flywheel, for motor vehicles is illustrated.

This damping flywheel has two coaxial parts 1, 2 mounted so as to move with respect to each other and counter to elastic means 3 acting radially overall. The parts 1, 2 consist in this case of masses.

The first part 1 is designed to be fixed with respect to rotation on a drive shaft, in this case on the crankshaft 20 of the internal combustion engine of the vehicle.

The second mass 2 is designed to be fixed with respect to rotation on a driven shaft, in this case the input shaft to the gearbox (not shown) of the motor vehicle.

This second mass 2 is pivotally mounted on a tubular hub 12 carried by the first mass 1.

The first mass 1 is in this case made of a castable material, advantageously cast iron, to increase the inertia of the damping flywheel.

As a variant, it can be aluminium based, the choice of material depending on the application.

This first mass 1 has a plate 11 carrying at its external periphery a starter ring 13 suitable for being driven by the starter of the vehicle.

This plate 11 is provided at its external periphery with an axially oriented cylindrical rim 19. The plate 11 is more solid at its external periphery and has at its internal periphery a thin internal portion 14 in the form of a flange.

In this case, the hub 12 is made in one piece with this internal portion 14 and thus constitutes the central part of the first mass 1. As a variant, the hub 12 may be attached to the flange 14.

The second mass 2 is rotatably mounted on the mass 1 by means of a bearing 5, and constitutes the reaction plate of a friction clutch having in a manner known per se a friction disc 30 depicted partially in FIG. 3, and a thrust plate, diaphragm and cover which are not visible.

The diaphragm, in a manner known per se, bears on the cover, adapted to be attached here to an axially oriented cylindrical peripheral rim 24 which the mass 2 has at its external periphery, to act on the thrust plate and clamp the friction linings of the friction disc 30 between the said thrust plate and the mass 2 having for this purpose a friction face 21 for the friction disc 30. This disc 30 has at its internal periphery a hub, not shown, fixed with respect to rotation on the input shaft of the gearbox.

The diaphragm of the clutch is adapted to be actuated, in a manner known per se, by a clutch release bearing (not shown).

Normally the clutch is engaged and the friction disc 30 is clamped between the mass 2 and the thrust plate of the clutch.

To disengage the clutch, it suffices to act by means of the clutch release bearing to make it pivot.

The second mass 2 is therefore fixed with respect to rotation in a releasable manner on the driven shaft by means of the friction clutch, and is made of cast iron in this case.

In this case, the bearing 5 consists of a small ball bearing. As a variant a smooth bearing can be used. The bearing 5 is interposed radially between the hub 12 of the mass 1 and the internal periphery (the internal bore) of the second mass 2.

The hub 12 is shouldered, as is the internal bore of the second mass 2.

The axial fixing of the bearing 5 is performed by means of the said shoulders and circlips (not given a reference numeral) engaged in grooves formed in the hub 12 and in the mass 2. This bearing 5 extends radially below the passages 22 (holes) provided in the second mass 2 for the passage of the tools for screwing the screws 31, with a hollow head in this case, for fixing the damping flywheel on the crankshaft 20. The passages therefore coincide with the holes formed in the internal portion 14 for the passage of the screws 31.

The two masses 1, 2 are mounted so as to be able to move with respect to one another counter, firstly, to elastic means 3 having at least one elastic member 34 acting radially overall between the said masses and pivotally mounted on each of the latter and, secondly, axially acting friction means 4.

In this case, the elastic means 3 are mounted at the internal periphery of the second mass 2 by means of second pivot means 6 and at the external periphery of the first mass 1 by means of first pivot means 7. The friction means 4 are located radially for the most part above the second pivot means 6.

In this case, a number of elastic devices 34 are provided and these are mounted in at least one pivoting cartridge having, firstly, a plate 33 wit h first housings for fitting the elastic members 34, in this case in the form of coil springs, and secondly, two guide components 32 disposed on each side of the said plate 33 and each having, opposite the first housings, a second housing for fitting the said elastic members 34.

It is therefore by means of the cartridges that the springs 34 are pivot ally mounted on each of the masses 1, 2.

In this case, two elastic members 34 are provided for each cartridge, the said elastic members 34 extending parallel to each other i n the cartridge. The first and second housings consist in this case of apertures, as c an b e seen better in FIG. 4.

The guide components 32 are fixed laterally to each other, in this case by riveting by means of columns forming a brace between the two components 32. In a variant, the components 32 are fixed to each other laterally by means of lateral edges welded together.

For the sake of simplicity, the columns have not been depicted in FIG. 4, and only the holes (without reference numerals) formed in the components 32 for the passage of the heads of the columns flattened to fix the components 32 are visible.

The plate 33 and the guide components 32 are mounted in reverse orientations, the plate 33 having at its internal periphery a protuberance 35 for mounting first pivot means 6 on the second mass 2, while the guide parts 32 each have at their external periphery a protuberance 36 opposite one another for mounting second pivot means 7 on the first mass 1.

The plate 33 is recessed at this level for the passage of the pin 7 (FIG. 4).

The protuberances 35 and 36 are radially offset with respect to each other, and the same is true of the pivot means 6 and 7, which are in this case radially aligned. As a variant, a slight circumferential gap may exist. The elastic means 3 therefore act radially overall.

In this case, the pivot means 6 an d 7 consist of pins. The pins 7, constituting the first pivot means, are located at the external periphery of the mass 1, while the pins 6, forming the second pivot means, are located at the internal periphery of the mass 2, here radially above the passages 22 for the fixing screws 31, in the vicinity of the said passages.

In this case, the protuberances 35 and 36 each have a hole for fitting sleeves (or tubes) respectively 37, 38 inserted into the said holes. The sleeve 37 is integral, for example by welding or bonding, with the protuberance 35, while the sleeve 38 is integral, for example by bonding or welding, with the guide components 32.

A lining is provided in the internal bore of each sleeve 37, 38 and thus forms a bearing respectively for the pin 6 and the pin 7.

The pin 7 is forcibly inserted into the mass 1 at the external periphery thereof and extends axially in the direction of the second mass 2. Its free end is inserted into a component 8 fixed by means of rivets 9 to the plate 11 of the mass 1. The component 8 stiffens the mass 1 while being adjacent to the mass 2.

The sleeve 38 is axially interposed between the plate 11 and this component 8. A clevis is thus formed for mounting the pin 7, which is thus well supported. The cartridge is also fixed in place axially.

Axially acting friction means 4 also act between the two masses. These friction means usually include at least one friction washer 44.

According to the invention, these friction means 4 are carried for the most part by the first mass 1 while being located axially between the first mass 1 and the elastic means 3. These friction means 4 extend above the fixing screws 31, an axial clearance existing between the guide components 32 and the friction means 4.

In this case, the internal portion 14 of the plate 11 presents a friction face, facing the mass 2, to a friction washer 44, in this case made of a synthetic material reinforced by fibres. This friction washer 44 has at its internal periphery a protuberance 46 directed axially towards the mass 2 to define an excess thickness obtained here by casting.

The washer 44 is subject to the action of an application washer 43 on which an axially acting elastic means 42 bearing on a shoulder 41 fixed to the mass 1 acts. This shoulder 41 can consist of a circlip mounted in a groove in the mass 1. In this case, the shoulder 41 consists of a washer fixed by means of rivets 45 to the mass 1. An action and reaction loop is thus formed within the first mass 1, an axial clearance existing between the shoulder 41, turned towards the portion 14, and the elastic means 3.

More precisely, the friction device 4 is located by virtue of the aforementioned change in the thickness of the plate 11.

This change in thickness axially defines an excess thickness 50 in the internal bore of which, level with the area in which the excess thickness 50 is embedded in the portion 14, grooves 49 closed off by the washer 41 and by the internal portion 14 are produced here by casting. In these grooves 49 there engage in a complementary manner lugs 47 formed at the external periphery of the application washer 43. Thus the washer 43 is fixed with respect to rotation with axial mobility with respect to the mass 1, through a tenon and mortise type connection.

Of course, it is possible to reverse the structures, the application washer 43 then having at its external periphery grooves in which flutes produced in the internal bore of the excess thickness 50 engage. The washer 41 thus closes off the grooves 49 or masks the flutes.

The excess thickness 46 of the washer 44 is provided with recesses in the form of notches 48 in which the pins 6 engage. The washer 44 is thus centred by the pins 6. In this case, the pins 6 have an area of insertion in the holes 23 of the mass 2 larger than their free end serving as a pivot pin for the bushes 37.

This end 61 of reduced diameter is extended axially in the direction of the internal portion 14, to enter the recesses 48 with a mounting clearance. As a variant, the end 61 engages with a circumferential clearance in the recesses.

In general terms, the washer 44 engages, optionally with clearance, with the end 61.

In this case, the elastic means 3 have four cartridges distributed regularly in a circle and therefore four pins 7 and four pins 6. Of course, this depends on the application. In the idle position, the cartridges extend radially.

Thus the cartridges are inclined when there is relative movement between the two masses 1, 2, the springs 34 are compressed and the friction washer 44 is rotated by the end 61 of the pins 6. The elastic means 3 thus have radial action overall. As this washer 44 is clamped between the application washer 43 and the internal portion 14 of the plate 11, there occur a relative movement and a friction determined by the spring 42 between the washer 44 and the affected faces of the application washer 43 and of the internal portion 14 fixed to the first mass.

It will be noted that the guide components 32 extend radially below the component 8, usually called the closing component.

More precisely, this component 8 is recessed level with the cartridges so that the elastic means 3 come as close as possible to the mass 2, the guide components 32 being located radially between the component 8 and an axial protuberance on the mass 2 facing the first mass and serving to mount the pins 6.

It will be appreciated that the friction washer 44 is very far away from the mass 2, so that it is not very sensitive to the temperature attained by the latter, which can be very high, notably when the vehicle is started a number of times on a hill, by virtue of the fact that the mass 2 constitutes the reaction plate of the clutch. The friction means 4 are therefore thermally protected, and there is therefore no risk of the washer 44 melting.

Figure 1:
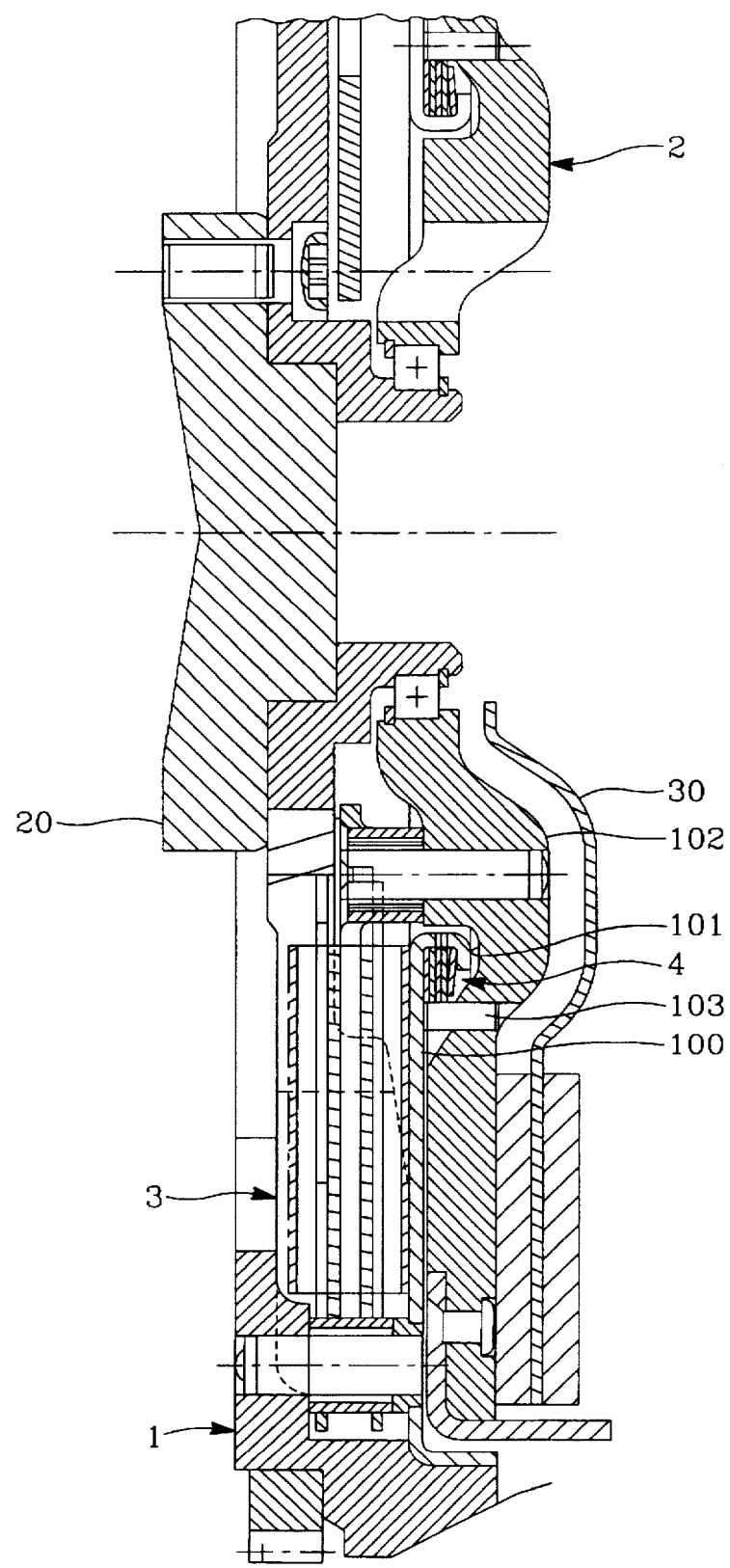
FIG. 1 is a partial view in cross section of a damping flywheel according to the prior art.

It will be noted that the mass 2 is in this case flat overall compared with the mass 2 of the prior art (FIG. 1). This mass 2 (FIG. 2) has no curved and hollowed part, so that it is more rigid. This makes it possible to increase the size of the areas of insertion of the pins 6 located above the openings 22 in the vicinity of the latter. The pins 6 are thus adjacent to the holes 22 for passage of the aforementioned tools.

The present invention is, of course, not limited to the example embodiment described. In particular, the first mass 1 can be in several parts, and have a flange of the same thickness as the internal portion 14 in FIG. 2, an intermediate ring carrying the starter ring and the component 8. The rivets 9 can then be used to fix these various components together.

The friction means 4 can have two friction washers and two application washers, one of the friction washers being interposed between the portion 14 and a first application washer, while the second friction washer is fixed axially between the two application washers, one of which is subject to the axially acting elastic means 42. These means 42 can consist of a diaphragm as in FIGS. 2 and 3, or as a variant a Belleville washer or an elastic crinkle washer.

In the case of the two friction washers circumferential clearances can be provided between the recesses therein and the pins 6. These clearances can differ from one washer to another so that the washers act in a staged manner.

It will be appreciated that the friction device 4 is located at the internal periphery of the elastic means 3, radially for the most part above the pins 6 (second pivot means 6).

The friction washer 44 can be driven, if applicable after a clearance has been taken up, by the sleeves 37 entering the recesses 48. In this case, the sleeves 37 are extended. These sleeves 37 are driven by the second pivot means 6 and therefore the second mass 2.

Thus, according to the invention, the friction means include a friction washer suitable for being driven, with or without a circumferential clearance, by the second mass, or more precisely by the second pivot means.

The structures can be reversed. The plate 33 can thus have at its external periphery a protuberance for mounting on the pin 7, while the guide components 32 each have at their internal periphery a protuberance for mounting on the pin 6. The elastic means 3 can consist of a plurality of coil springs, each end of the coil spring being provided with a loop for mounting respectively on the pin 6 and 7. All the arrangements described in the document FR 93 15581 filed on 23 Dec., 1993 can be envisaged.

Thus a single device can be provided per cartridge, which can have two interlinked piston cylinder elements, with interposing of the elastic device working in compression a s in the document WO 94/27062.

It is possible to replace the pins 6 and 7 with journals cast in one piece respectively with the mass 2 and the mass 1, so that the pivot means 6, 7 are not necessarily pins.

Likewise, it is possible to provide needle bearings between the sleeves 37, 38 and the pins 6, 7.

Likewise, it is possible to line the face of the portion 14, forming a friction face for the washer 44, with a friction material with an appropriate coefficient of friction. In each case, this friction face faces the second mass.

In place of the excess thickness 50, the plate 11 can have, cast in one piece, an axially oriented sleeve provided with grooves or flutes, for rotational connection of the application washer.

In general terms, the excess thickness 50 or the sleeve can serve to centre the washer 44. In this case, the washer 44 can be driven by only one of the pins 6 or one of the sleeves (or tubes) 37.

The pins 6 can be hollow, located in the holes 22. The tools for screwing the screws 31 then pass through the pins 6. The washer 44 can then, by casting, have the desired shape to engage with the pin or pins 6 or the sleeve or sleeves 37.

For the idle position of the damping flywheel, the pins 6 and 7 are radially aligned. This is not always the case, the pins 6 being able to be slightly offset circumferentially with respect to the pins 7 for the said idle position. In each case, the elastic members 34 act radially overall between the two masses.

I claim:

1. A Damping flywheel comprising two coaxial masses (1, 2) mounted so as to be movable with respect to one another said flywheel having an elastic means (3) having at least one elastic member (34) disposed between and rotatable with respect to said masses and an axially acting friction means (4), wherein a first mass (1) of the masses (1, 2) is adapted to be fixed with respect to rotation to a drive Shaft, and a second mass (2) of the masses (1, 2) is rotatably mounted on said first mass (1), and the elastic means (3) is pivotally mounted at an external periphery of the first mass (1) by means of a first pivot means (7) and pivotally mounted at an internal periphery of the second mass (2) by means of a second pivot means (6), said friction means (4) extends radially beyond the second pivot means (6), wherein the friction means (4) is carried by the first mass (1) and being located axially between said first mass and said elastic means (3), and the friction means (4) comprises at least one friction washer (44) and the friction means (4) is located by means of an excess thickness (50) in the first mass (1), the mass having at its internal periphery a portion (14) of reduced thickness.

2. A Damping flywheel comprising two coaxial masses (1, 2) mounted so as to be movable with respect to one another said flywheel having an elastic means (3) having at least one elastic member (34) disposed between and rotatable with respect to said masses and an axially acting friction means (4), wherein a first mass (1) of the masses (1, 2) is adapted to be fixed with respect to rotation to a drive Shaft, and a second mass (2) of the masses (1, 2) is rotatably mounted on said first mass (1), and the elastic means (3) is pivotally mounted at an external periphery of the first mass (1) by means of a first pivot means (7) and pivotally mounted at an internal periphery of the second mass (2) by means of a second pivot means (6), said friction means (4) extends radially beyond the second pivot means (6), wherein the friction means (4) is carried by the first mass (1) and being located axially between said first mass and said elastic means (3), and the friction means (4) comprises at least one friction washer (44), wherein the friction washer (44) is suitable for being clamped axially between the first mass (1) and an application washer (43) fixed with respect to rotation to the first mass (1),the application washer (43) is subject to the action of an axially acting elastic washer (42) bearing on a shoulder (41) fixed to the first mass (1), and said shoulder (41) comprises a washer fixed to the first mass (1).

3. A damping flywheel comprising two coaxial masses (1, 2) mounted so as to be movable with respect to one another said flywheel having an elastic means (3) having at least one elastic member (34) disposed between and rotatable with respect to said masses and an axially acting friction means (4), wherein a first mass (1) of the masses (1, 2) is adapted to be fixed with respect to rotation to a drive Shaft, and a second mass (2) of the masses (1, 2) is rotatably mounted on said first mass (1), and the elastic means (3) is pivotally mounted at an external periphery of the first mass (1) by means of a first pivot means (7) and pivotally mounted at an internal periphery of the second mass (2) by means of a second pivot means (6), said friction means (4) extends radially beyond the second pivot means (6), wherein the friction means (4) is carried by the first mass (1) and being located axially between said first mass and said elastic means (3), and the friction means (4) comprises at least one friction washer (44) wherein, the elastic means (3) is pivotally mounted on the second mass (2) by means of a pin (6) carried by the second mass (2), and the friction washer (44) has at an internal periphery an excess thickness (46) adapted to engage an extension of the pivot pin entering the excess thickness (46).

4. A damping flywheel comprising two coaxial masses (1, 2) mounted so as to be movable with respect to one another said flywheel having an elastic means (3) having at least one elastic member (34) disposed between and rotatable with respect to said masses and an axially acting friction means (4), wherein a first mass (1) of the masses (1, 2) is adapted to be fixed with respect to rotation to a drive Shaft, and a second mass (2) of the masses (1, 2) is rotatable mounted on said first mass (1), and the elastic means (3) is pivotally mounted at an external periphery of the first mass (1) by means of a first pivot means (7) and pivotally mounted at an internal periphery of the second mass (2) by means of a second pivot means (6), said friction means (4) extends radially beyond the second pivot means (6), wherein the friction means (4) is carried by the first mass (1) and being located axially between said first mass and said elastic means (3), and the friction means (4) comprises at least one friction washer (44), the second pivot means comprises at least one pin (6) having a portion inserted in the mass (2) larger than a free end (61) forming a pivot pin for the elastic means (3) and the pin (6) is located radially above openings (22) provided in the second mass (2) to facilitate fixing screws (31) designed to fix the damping flywheel on said drive shaft wherein the two masses (1, 2) are mounted so as to be able to move with respect to one another, by means of a bearing (5) interposed radially between a hub (12) fixed to the first mass (1) and an internal bore in the second mass (2), the bearing (5) is located radially below said openings (22) and in the friction means (4) extend radially above the fixing screws (31).

5. A damping flywheel comprising two coaxial masses (1, 2) mounted so as to be movable with respect to one another said flywheel having an elastic means (3) having at least one elastic member (34) disposed between and rotatable with respect to said masses and an axially acting friction means (4), wherein a first mass (1) of the masses (1, 2) is adapted to be fixed with respect to rotation to a drive Shaft, and a second mass (2) of the masses (1, 2) is rotatable mounted on said first mass (1), and the elastic means (3) is pivotally mounted at an external periphery of the first mass (1) by means of a first Divot means (7) and Pivotally mounted at an internal periphery of the second mass (2) by means of a second pivot means (6), said friction means (4) extends radially beyond the second pivot means (6), wherein the friction means (4) is carried by the first mass (1) and being located axially between said first mass and said elastic means (3), and the friction means (4) comprises at least one friction washer (44) wherein, the friction means is located by means of an axially oriented sleeve fixed to the first mass.

* * * * *